United States Patent [19]
Ofer et al.

[11] Patent Number: 5,898,863
[45] Date of Patent: Apr. 27, 1999

[54] METHOD AND APPARATUS FOR DETERMINING I/O SIZE DISTRIBUTION OF AN INPUT/OUTPUT SYSTEM AND ITS USE FOR LOAD SIMULATION

[75] Inventors: Erez Ofer, Brookline; Paul F. Hale, Hudson; William J. Glynn, Sherborn, all of Mass.

[73] Assignee: EMC Corporation, Hopkinton, Mass.

[21] Appl. No.: 08/868,309

[22] Filed: Jun. 3, 1997

[51] Int. Cl.[6] .................................................. G06F 9/455
[52] U.S. Cl. .......................................... 395/500; 364/578
[58] Field of Search .............................. 395/500, 200.09; 364/200, 578

[56] References Cited

U.S. PATENT DOCUMENTS

| | | | |
|---|---|---|---|
| 4,862,347 | 8/1989 | Rudy | 364/200 |
| 5,121,492 | 6/1992 | Saville, III et al. | 395/500 |
| 5,544,320 | 8/1996 | Konrad | 395/200.09 |
| 5,546,562 | 8/1996 | Patel | 395/50 |
| 5,680,590 | 10/1997 | Parti | 395/500 |

OTHER PUBLICATIONS

By Fancois Gigon, "Modeling and Simulation of the 16 Megabit Eprom Cell for Write/Read Operation with a Compact Spice Model", IEEE, IEDM 90, 1990, pp. 205–208.

By Valerie Taylor, "Sparse Matrix Computations: Implications for Cache Designs", IEEE, 1992, pp. 598–607.

By Yan et al., "A New Resonant–Tunnel Diode–Based Multivalued Memory Circuit Using a MESFET Depletion Load", IEEE Journal of Solid–State Circuits, vol. 27, No. 8, Aug. 1992, pp. 1198–1202.

By Keeney et al., "Complete Transient Simulation of Flash EEPROM Devices", IEEE Transactions on Electron Devices, vol. 39, No. 12, Dec. 1992, pp. 2750–2757.

By Gjessing et al., "Performance of the RamLink Memory Architecture", IEEE Proceddings of the 27th Annual Hawaii Int'l Conference on System Sciences, 1994, pp. 154–162.

By Chang et al., "Evaluation of sequential–in–random–out memory device", IEEE Electronics Letters, Apr. 13th, 1995, vol. 31, No. 8, pp. 620–621.

*Primary Examiner*—Kevin J. Teska
*Assistant Examiner*—Russell W. Frejd
*Attorney, Agent, or Firm*—Fish & Richardson P.C.

[57] ABSTRACT

A method and apparatus for simulating the input/output operations of a memory unit, such as a disk drive array, provide for determining over a predetermined time period, a profile which includes the number of read and write operations for the memory unit and the number of blocks of data read or written during each such operation. The resulting data of the profile is sorted in accordance with the cumulative likelihood of occurrence of the operations, and the read and write operations are then recreated, in a random statistical fashion, in accordance with the sorted resulting data to simulate the frequency of occurrence of the read and write operations at a remote site for the original memory device. The validity of the simulation can be ascertained by repeating the read/write operation collection process during the simulation process and comparing the resulting data with the original data. The simulation can thus take place without adversely affecting operation at the customer's site.

15 Claims, 8 Drawing Sheets

WRITE TABLE

| LEN | C | LEN | C | LEN | C | LEN | C | LEN | C | LEN | C | LEN | C | LEN | C |
|---|---|---|---|---|---|---|---|---|---|---|---|---|---|---|---|
| 01 | 581 | 02 | 511 | 03 | 42 | 04 | 62 | 05 | 60 | 06 | 23 | 07 | 27 | 08 | 758 |
| 09 | 9 | 0A | 19 | 0B | 19 | 0C | 13 | 0D | 8 | 0E | 4 | 0F | 7 | 10 | 2 |
| 11 | 1 | 12 | 0 | 13 | 2 | 14 | 0 | 15 | 2 | 16 | 1 | 17 | 1 | 18 | 0 |
| 19 | 1 | 1A | 172 | 1B | 0 | 1C | 0 | 1D | 0 | 1E | 5 | 1F | 0 | 20 | 53 |
| 21 | 608 | 22 | 1551 | 23 | 867 | 24 | 160 | 25 | 42 | 26 | 13 | 27 | 6 | 28 | 8 |
| 29 | 10 | 2A | 5 | 2B | 3 | 2C | 7 | 2D | 10 | 2E | 6 | 2F | 6 | 30 | 6 |
| 31 | 4 | 32 | 12 | 33 | 2 | 34 | 3 | 35 | 1 | 36 | 6 | 37 | 5 | 38 | 5 |
| 39 | 2 | 3A | 4 | 3B | 9 | 3C | 6 | 3D | 2 | 3E | 0 | 3F | 1196 | 40+ | 5 |

*FIG. 4A*  ~52a

READ TABLE

| LEN | C | LEN | C | LEN | C | LEN | C | LEN | C | LEN | C | LEN | C | LEN | C |
|---|---|---|---|---|---|---|---|---|---|---|---|---|---|---|---|
| 01 | 475 | 02 | 602 | 03 | 114 | 04 | 118 | 05 | 93 | 06 | 33 | 07 | 22 | 08 | 12128 |
| 09 | 19 | 0A | 33 | 0B | 28 | 0C | 22 | 0D | 15 | 0E | 17 | 0F | 28 | 10 | 8 |
| 11 | 12 | 12 | 7 | 13 | 11 | 14 | 7 | 15 | 7 | 16 | 3 | 17 | 2 | 18 | 4 |
| 19 | 5 | 1A | 5 | 1B | 0 | 1C | 0 | 1D | 0 | 1E | 7 | 1F | 0 | 20 | 1051 |
| 21 | 13015 | 22 | 32471 | 23 | 18134 | 24 | 3198 | 25 | 585 | 26 | 193 | 27 | 51 | 28 | 36 |
| 29 | 41 | 2A | 21 | 2B | 24 | 2C | 43 | 2D | 44 | 2E | 57 | 2F | 30 | 30 | 26 |
| 31 | 29 | 32 | 22 | 33 | 9 | 34 | 6 | 35 | 15 | 36 | 25 | 37 | 28 | 38 | 43 |
| 39 | 64 | 3A | 63 | 3B | 64 | 3C | 47 | 3D | 42 | 3E | 34 | 3F | 663 | 40+ | 22 |

*FIG. 4B*  ~52b

| (cont.) | (cont.) | (cont.) | (cont.) |
|---|---|---|---|
| 0.356926 22 R | 0.990745 3E R | 0.998516 14 R | 1.000000 1D R |
| 0.556258 23 R | 0.991107 0A R | 0.998593 12 R | 1.000000 1C W |
| 0.699321 21 R | 0.991470 06 R | 0.998670 0F W | 1.000000 1C R |
| 0.832633 08 R | 0.991800 2F R | 0.998736 3C W | 1.000000 1B W |
| 0.867786 24 R | 0.992119 31 R | 0.998802 36 W | 1.000000 1B R |
| 0.884835 22 W | 0.992426 37 R | 0.998868 34 R | 1.000000 18 W |
| 0.897982 3F W | 0.992734 0F R | 0.998934 30 W | 1.000000 14 W |
| 0.909535 20 R | 0.993042 0B R | 0.999000 2F W | 1.000000 12 W |
| 0.919065 23 W | 0.993339 07 W | 0.999066 2E W | |
| 0.927397 08 W | 0.993625 30 R | 0.999132 27 W | |
| 0.934685 3F R | 0.993899 36 R | 0.999187 40 W | |
| 0.941368 21 W | 0.994163 2B R | 0.999242 38 W | |
| 0.947985 02 R | 0.994416 06 W | 0.999297 37 W | |
| 0.954416 25 R | 0.994658 40 R | 0.999351 2A W | |
| 0.960802 01 W | 0.994900 32 R | 0.999406 1E W | |
| 0.966419 02 W | 0.995141 0C R | 0.999461 1A R | |
| 0.971640 01 R | 0.995383 07 R | 0.999516 19 R | |
| 0.973762 26 R | 0.995614 2A R | 0.999560 3A W | |
| 0.975652 1A W | 0.995823 0B W | 0.999604 31 W | |
| 0.977411 24 W | 0.996032 0A W | 0.999648 18 R | |
| 0.978708 04 R | 0.996241 09 R | 0.999692 0E W | |
| 0.979961 03 R | 0.996428 0E R | 0.999725 34 W | |
| 0.980984 05 R | 0.996592 35 R | 0.999758 2B W | |
| 0.981687 3B R | 0.996757 0D R | 0.999791 16 R | |
| 0.982391 39 R | 0.996900 26 W | 0.999813 3D W | |
| 0.983083 3A R | 0.997043 0C W | 0.999835 39 W | |
| 0.983765 04 W | 0.997175 32 W | 0.999857 33 W | |
| 0.984424 05 W | 0.997307 11 R | 0.999879 17 R | |
| 0.985051 2E R | 0.997428 13 R | 0.999901 15 W | |
| 0.985633 20 W | 0.997538 2D W | 0.999923 13 W | |
| 0.986194 27 R | 0.997648 29 W | 0.999945 10 W | |
| 0.986710 3C R | 0.997747 3B W | 0.999956 35 W | |
| 0.987194 2D R | 0.997846 33 R | 0.999967 19 W | |
| 0.987667 38 R | 0.997944 09 W | 0.999978 17 W | |
| 0.988139 2C R | 0.998032 28 W | 0.999989 16 W | |
| 0.988601 3D R | 0.998120 10 R | 1.000000 11 W | |
| 0.989063 25 W | 0.998208 0D W | 1.000000 3E W | |
| 0.989524 03 W | 0.998285 2C W | 1.000000 1F W | |
| 0.989975 29 R | 0.998362 1E R | 1.000000 1F R | |
| 0.990371 28 R | 0.998439 15 R | 1.000000 1D W | |

*FIG. 5*

| (cont.) | (cont.) | (cont.) | (cont.) |
|---|---|---|---|
| 0.358167 22 R | 0.992027 25 W | 0.999163 34 R | 1.000000 17 R |
| 0.556110 23 R | 0.992396 3C R | 0.999230 33 W | 1.000000 16 W |
| 0.701394 21 R | 0.992764 06 R | 0.999297 32 W | 1.000000 15 W |
| 0.835756 08 R | 0.993066 06 W | 0.999364 1A R | 1.000000 14 W |
| 0.870628 24 R | 0.993334 40 R | 0.999431 13 R | 1.000000 12 W |
| 0.886942 22 W | 0.993602 36 R | 0.999464 40 W | 1.000000 11 W |
| 0.899203 3F W | 0.993870 31 R | 0.999498 3D W | 1.000000 10 W |
| 0.911028 20 R | 0.994138 2F R | 0.999531 39 W | 1.000000 0F W |
| 0.920173 23 W | 0.994406 2B R | 0.999565 31 W | |
| 0.928514 08 W | 0.994640 32 R | 0.999598 30 W | |
| 0.935515 3F R | 0.994875 30 R | 0.999632 2E W | |
| 0.942516 25 R | 0.995109 2A R | 0.999665 2C W | |
| 0.949183 21 W | 0.995344 0C W | 0.999699 2B W | |
| 0.955815 02 R | 0.995578 0B W | 0.999732 29 W | |
| 0.961778 02 W | 0.995813 0A R | 0.999766 28 W | |
| 0.967573 01 W | 0.996014 0F R | 0.999799 27 W | |
| 0.972933 01 R | 0.996215 0E R | 0.999833 26 W | |
| 0.975312 26 R | 0.996416 0A W | 0.999866 19 R | |
| 0.977321 24 W | 0.996617 07 W | 0.999900 16 R | |
| 0.979063 1A W | 0.996784 3B W | 0.999933 13 W | |
| 0.980269 03 R | 0.996952 10 R | 0.999967 12 R | |
| 0.981308 05 R | 0.997086 38 W | 1.000000 0E W | |
| 0.982112 3B R | 0.997220 37 R | 1.000000 3E W | |
| 0.982882 04 R | 0.997354 35 R | 1.000000 3A W | |
| 0.983619 04 W | 0.997488 2A W | 1.000000 36 W | |
| 0.984323 39 R | 0.997622 1E R | 1.000000 35 W | |
| 0.984993 3D R | 0.997756 0D R | 1.000000 34 W | |
| 0.985629 28 R | 0.997890 09 R | 1.000000 2F W | |
| 0.986232 03 W | 0.998024 07 R | 1.000000 1F W | |
| 0.986802 2E R | 0.998124 37 W | 1.000000 1F R | |
| 0.987371 27 R | 0.998225 33 R | 1.000000 1D W | |
| 0.987941 05 W | 0.998325 2D W | 1.000000 1D R | |
| 0.988443 2C R | 0.998426 1E W | 1.000000 1C W | |
| 0.988945 29 R | 0.998526 15 R | 1.000000 1C R | |
| 0.989448 20 W | 0.998627 14 R | 1.000000 1B W | |
| 0.989917 3E R | 0.998727 11 R | 1.000000 1B R | |
| 0.990386 38 R | 0.998828 0D W | 1.000000 19 W | |
| 0.990821 0B R | 0.998928 0C R | 1.000000 18 W | |
| 0.991223 3A R | 0.999029 09 W | 1.000000 18 R | |
| 0.991625 2D R | 0.999096 3C W | 1.000000 17 W | |

*FIG. 8*

METHOD AND APPARATUS FOR DETERMINING I/O SIZE DISTRIBUTION OF AN INPUT/OUTPUT SYSTEM AND ITS USE FOR LOAD SIMULATION

BACKGROUND OF THE INVENTION

The invention relates generally to input/output systems, and more particularly, to a method and apparatus for simulating the input/output behavior of one system in a second system.

As computer systems become more complex, and as businesses rely more upon their computer systems, any performance problem which requires the system to shut down becomes a major and potentially disastrous event.

A failure of or decrease in input/output behavior in, for example, a memory system, could become a bottleneck to efficiency and throughput in the overall operation of the system. Thus, much effort and customer engineering has been directed to being able to resolve problems that occur in the input/output process. Typically, the problem is resolved by recreating the precise input/output data and path. This involves however, taking over the system having the performance problem, determining precisely where and what the problem is by recreating the problem at the customer site, for example by running the applications and data which led to the problem, and then resolving the problem.

Such methods of problem isolation and correction accordingly require the customer's system to be off-line for a period of time, and further can require intensive customer engineer time of the customer site. Aside from being relatively costly in customer time, this method of solving a performance issue can further adversely affect the customer's operations.

SUMMARY OF THE INVENTION

The invention relates to a method and apparatus for simulating the input/output operations of a memory unit, for example, a disk storage array. The method features the steps of determining, over a predetermined time period, a profile including the type of operation, a read or write, for the memory unit and the number of bytes of data (the block size) read or written during each operation; sorting the resulting data of the profile in accordance with a likelihood of occurrence of each operation and block size; and recreating, in a random statistical fashion, the read and write operations in accordance with the sorted resulting data to simulate the frequency of occurrence of the read and write operations for the memory device.

In another aspect, the recreating step features the step of recreating the read and write operations at a second memory unit thereby evaluating the original memory unit operation without interrupting normal operation of the memory unit. The method can further feature the steps of repeating the determining and sorting steps as applied to the data written to and read from the second memory unit, and comparing the sorted resulting data from the operation of the first and second memories for validating the simulating operation.

In yet another aspect of the invention, the sorting operation features the steps of ordering the resulting data in accordance with a decreasing likelihood of occurrence, and associating, with each data entry, a cumulative likelihood of occurrence value of that data entry and all more likely data entries. In another particular aspect of the invention, the recreating step further features the steps of generating a random number in the range of the cumulative likelihood of occurrence values; recreating the operation of that entry having a closest cumulative likelihood of occurrence value greater than the generated random number and repeating the generating and recreating steps for at least the predetermined time period.

The apparatus of the invention, a system for simulating read and write operations for a memory device, features a data collection element for accumulating, over a predetermined time period, a profile of the number of read and write operations for the memory device and including the number of bytes of data (block size) read or written during each operation; a sorting circuitry for sorting the resulting data of the profile in accordance with the likelihood of occurrence of the operations (including block size); and a simulation circuitry for recreating, in a random statistical fashion, based on the sorted read and write operations, read and write operations for a memory system to simulate the frequency of occurrence of the read and write operations of the memory device.

In particular aspects of the invention, the simulation circuitry operates with a memory system remote from the memory device. The memory device and the memory system have identical specifications, and will include at least one, and preferably a plurality, of disk drive memories along with at least one disk drive controller. Preferably, the simulating circuitry features circuitry for recreating the read and write operations for the memory system, distant from the memory device, thereby evaluating the memory device without interrupting normal operation of the device.

In another aspect of the invention, the system further features data collection circuitry and sorting circuitry for repeating the accumulating and sorting operations on the read and write operations from and to the memory system, and validation circuitry, for comparing the accumulated data resulting from operations for the memory device and operations for the memory system, for validating the simulation process. Preferably, the sorting circuitry features circuitry for ordering the resulting data in accordance with a decreasing likelihood of occurrence of the read and write operations, and circuitry for associating, with each data entry, a cumulative likelihood of occurrence value of that data entry and all more likely data entries. The simulating circuitry further preferably features a random number generator for generating numbers uniformly distributed in the range of the cumulative likelihood of occurrence values; simulating circuitry for simulating the read or write operation having a closest associated cumulative likelihood of occurrence value greater than the random number; and circuitry for repeating operation of the random number generator and simulating circuitry for at least a predetermined time period.

Thus, the invention advantageously provides an analysis tool for investigating performance issues for any input/output traffic flow within the memory system. The analysis tool allows the analysis to advantageously take place off-site, away from the customer system. In particular embodiments of the invention, the data regarding the customer system, having a performance throughput issue, can be obtained either by running software at the customer system site, and controlled by a memory device computer console, directly or through a telephone-modem connection, as described in detail below. The result is an effective, nonintrusive, analysis method and apparatus enabling substantial simulation of the performance issue at one machine to be recreated off-site and without interruption of the customer's applications.

BRIEF DESCRIPTION OF THE DRAWINGS

Other objects, features, and advantages of the invention will be apparent from the following description taken together with the drawings in which:

FIGS. 4A and 4B are tables illustrating the first collection of data in accordance with the invention;

FIG. 5 is a sorted list of operations in accordance with a next step of the invention;

FIG. 8 is an ordered list of the data collected at the test site in accordance with the invention.

DESCRIPTION OF A PREFERRED EMBODIMENT OF THE INVENTION

Figure 1:
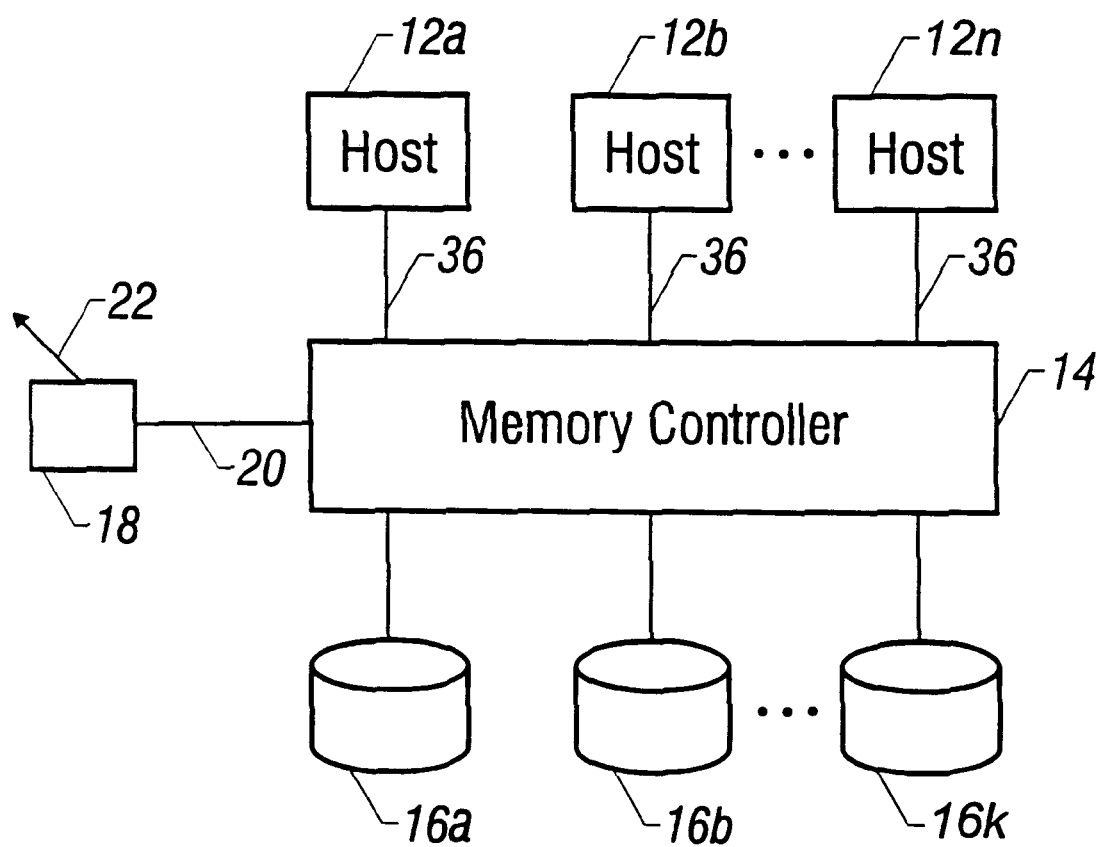
FIG. 1 is a block diagram of a typical computer memory system in which the invention is the useful.

Referring to FIG. 1, the invention relates to a computer system wherein at least one, and more likely a plurality of hosts 12a, 12b, . . . , 12n, connect to a memory controller system 14, such as the EMC Symmetrix disk array memory system. The memory controller 14 acts as the interface between the host computers and a plurality of mass storage devices, such as, for example, disk drives 16a, 16b, . . . , 16k. Data written by the host or read from the disk drive elements pass through the memory controller system which acts as a two way communications path with substantial capabilities. For example, in some systems, the data from the host are uniformly striped across all of the disk storage devices; and in other systems, the data from the host are stored on the disk drives 16 according to a RAID protocol. In yet other embodiments of the invention, all of the data from a particular host can be stored on a single disk drive or in different logical volumes of the same or different disk drives, depending upon the nature and the source of the data and host. A host computer can also read data from one or more of the disk drive units.

When a problem arises which impairs performance of the system, for example, a decrease in throughput, the problem can arise in either the host, the memory controller, the disk drive elements, or in combinations thereof. In order to analyze and correct the problem, it is desirable not to bring down the customer's computer(s) thereby placing them off-line and perhaps significantly impairing the customer's ability to do business. In accordance with the invention, therefore, a statistical analysis of the read and write operations, on a block by block basis as described below, is implemented and performed "off-site" in order to provide a solution to the throughput problem without imposing any further performance degradation on of the customer's system.

In this respect, referring again to FIG. 1, the system can also include a console PC 18 connected over a channel 20 to the memory controller system and, over a modem connection 22 through a network, (such as telephone network) to a remote site. Data can then be collected for analysis without having to travel to the customer's site (and, as described below, without bringing down or otherwise interfering with the system operation).

Figure 2:
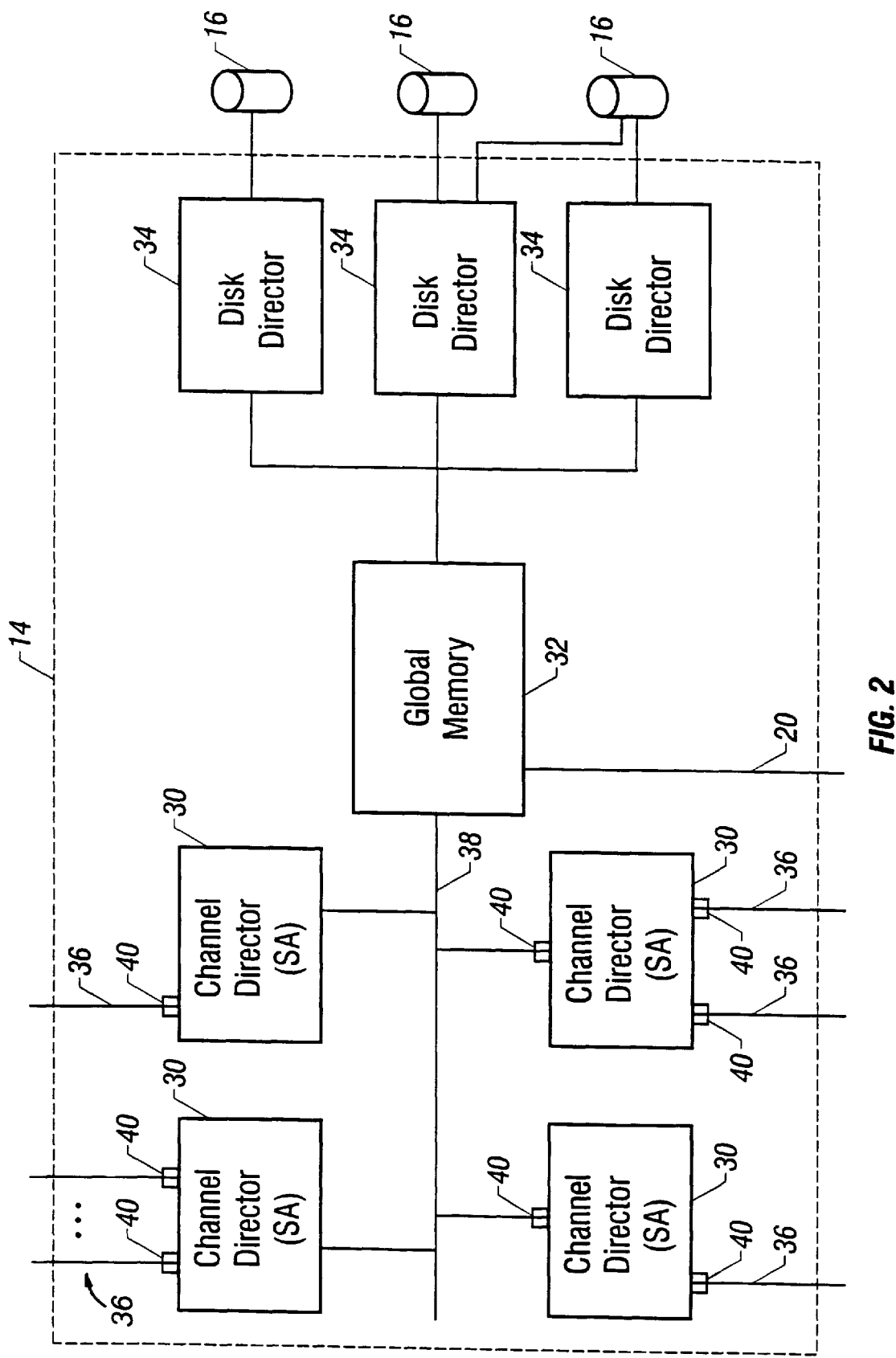
FIG. 2 is a block diagram of a memory system in which the invention finds particular use.

Referring to FIG. 2, in a particular embodiment according to the invention, the disk controller is configured to have a plurality of channel directors (most often referred to a SCSI adapters when operating according to a SCSI protocol) 30 connecting to a global memory 32 through which all data and commands flow. The global memory 32 is connected to a plurality of disk directors 34 (also typically SCSI adapters) which connect to the disk drives 16. In accordance with this particular embodiment of the invention, each channel director operates over channels 36 and 38 using a SCSI protocol. In the illustrated embodiment, it is the read and write operations, passing through each SCSI adapter 30, which will be monitored and modeled. Each channel director 30 can be connected to one or more host computers over buses 36 (typically, one host I/O Controller per port 40).

Figure 3:
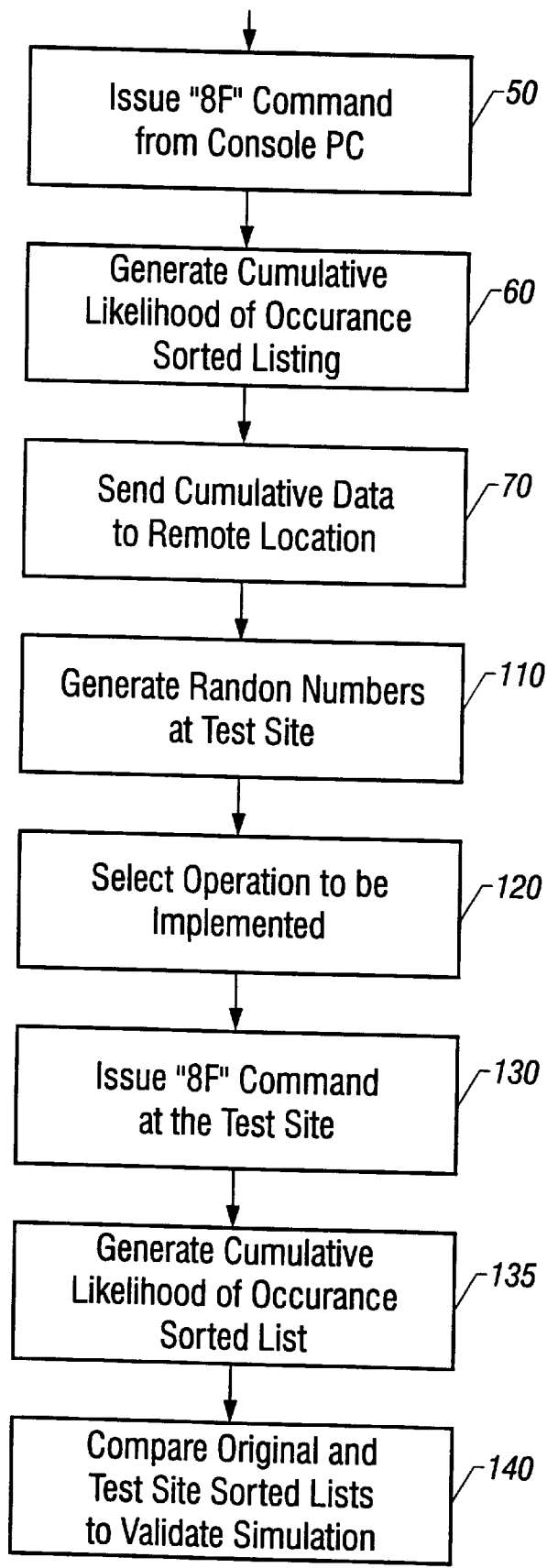
FIG. 3 is a flow chart in accordance with the operation of the invention.

Referring to FIG. 3, in operation, the console PC computer 18, appropriately programmed, can issue to the disk controller a command, in the illustrated embodiment, a so-called Symmetrix command, which commands a channel director 30, at the channel controller, to capture information regarding the number of read and write blocks passing through the director during a predetermined time period (step 50). Referring to FIGS. 4A and 4B, two tables of information 52a and 52b respectively, corresponding to the information provided by a director 30, are presented, one graph for each of the read and write data, for a channel director (SCSI adapter). Referring to FIG. 4A, for example, there is illustrated for each block length during the predetermined period of time for the particular SCSI adapter 30, the number of (all) write operations which were performed by the adaptor, for all hosts connected to it, having a block length equal to the designated number of bytes (the length parameter). In the illustrated embodiment, each block equals 512 bytes. Thus, there were 581 write operations of one block, 511 write operations of two blocks, 42 write operations with three blocks, . . . , and 5 write operations with 64 or more blocks. (Note that in FIGS. 4A and 4B, the lengths are given in hexadecimal format.) Similarly, referring to FIG. 4B, there were 475 read operations of one block, 602 read operations of two blocks, . . . , and 22 read operations of 64 or more blocks.

The data of FIGS. 4A and 4B are combined to generate a cumulative likelihood of occurrence, ordered listing such as that illustrated in FIG. 5 (step 60). In accordance with FIG. 5, the first column provides a cumulative likelihood of occurrence of all read or write operations (FIGS. 4A and 4B), which are at least as likely to occur as the entry being considered. The second column represents block length, and the third column represents the nature of the operation, a read (R) or a write (W). In other words, in this example, the most likely operation for this channel director during the measured time period was a read operation of 22 blocks, which had a likelihood of occurrence of 0.356926. The next most likely operation was a read operation of 23 blocks. Its likelihood of occurrence is 0.199332. Accordingly, the cumulative likelihood of occurrence of the two top entries, which is listed in FIG. 3, is 0.556258. Continuing, the next most likely operation is a read operation of 21 blocks. Its likelihood of occurrence is 0.143063 and the cumulative likelihood of occurrence of the top three most likely operations is 0.699321. In this particular example, the sixth most likely operation is a write operation of 22 blocks. Its likelihood of occurrence is 0.017049 and the cumulative likelihood of occurrence of the top six most likely operations is 0.884835. Continuing in this manner, each of the operations illustrated in the tables of FIGS. 4A and 4B can be determined, and the list of FIG. 5 illustrates the cumulative likelihood of occurrence for these operations rounded to six significant decimal places. The likelihood of occurrence of any operation is determined by dividing the number of occurrences of that operation, by the total number of operations occurring in that period of time.

Once the likelihood of occurrence list, the sorted list of FIG. 4, has been determined, that information can be provided using any of a number of different procedures to a remote location. In fact, as described above, a remote location can, by telephone, dial-up through the console PC 18, determine the data illustrated in FIG. 5, and have it sent through a modem connection (line 22) to the remote location (Step 70). At the remote location, the data of FIG. 5 is received by a console PC 18, and is employed, preferably with a configuration substantially identical to the configuration found at the customer site, to simulate, statistically, the read and write operations which were performed by the channel director at the customer site during the measuring predetermined time period. In this manner, the controller can simulate, statistically, the processes running at the customer's site without requiring the customer site to be taken off-line for maintenance.

Figure 7:
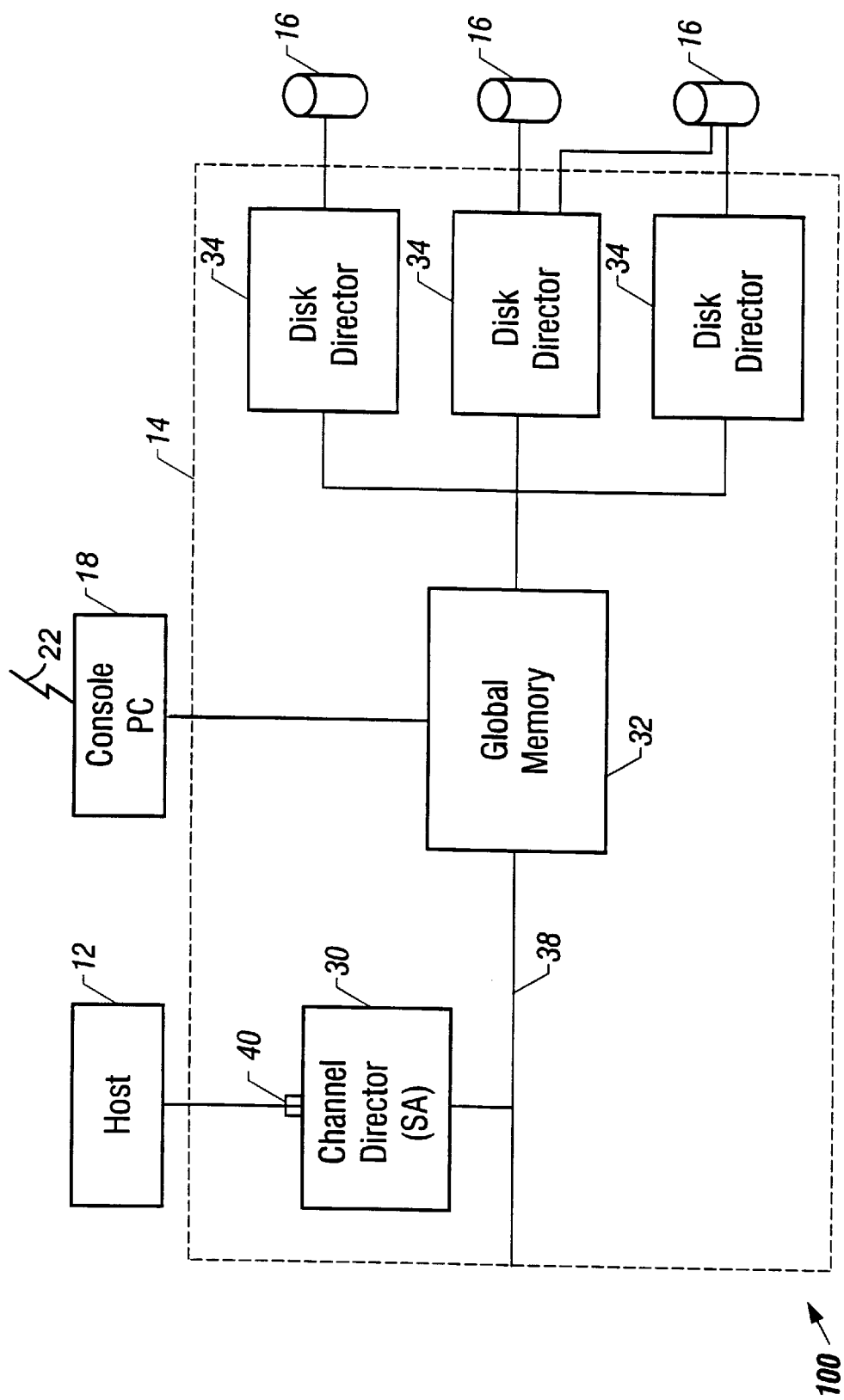
FIG. 7 is a block diagram of the memory system at the remote site.

Referring now to FIG. 7, in the reconstruction process, the remote site configuration 100 conforms, as closely as possible to the customer site from which the statistical read/write data was gathered. Thus the controller 14, including the channel director(s) 30, the SCSI bus 38, the global memory 32, and the disk directors 34 should match, in specifications, the corresponding configuration at the customer site.

Referring again to FIGS. 3, 5, and 7, the system employs a random number generator, which generates numbers uniformly distributed in the range of the cumulative likelihood of occurrence values, (Step 110) zero to one in the illustrated embodiment. These randomly generated numbers are used to select the particular read or write operations to be performed at the disk drive controller to simulate the demands placed upon the controller by the host computer. (The random number generator can be implemented either at the console PC 18 or host computer 12 at the test site 100). For each random number which has generated, the system examines the list of FIG. 5 and selects that operation having an associated cumulative likelihood of occurrence which is closest to, but greater than, the randomly generated number as the operation to be implemented (Step 120). Thus, for the randomly generated number "0.7", a read operation of 8 blocks is implemented from the host computer at the test simulation site. This occurs even though the closest cumulative likelihood of occurrence to 0.7 belongs to a read of 21 blocks, since the next higher closest cumulative likelihood of occurrence is 0.832933 belonging to the 8 blocks read. Similarly, if the randomly generated number were 0.96, the operation to be implemented would be a write of one block.

In this manner, the read and write operations being applied to the controller at the simulation test site approximate statistically, the likelihood of occurrence of the read and write operations which were actually measured at the customer site where a performance issue had occurred. In order to verify and validate the operation at the test site, the console PC 18 at the test site can perform the identical processes which led to the generation of the sorted list of FIG. 5 by sending a command, in the illustrated embodiment, a Symmetrix command, to the controller and performing the same statistical analysis at the test site as was performed at the customer site. In this process, the resulting lists of sorted cumulative likelihood of occurrence data are compared and any discrepancies can be quickly noticed and accounted for, if necessary. In accordance with an implemented embodiment of the invention, the statistical closeness of the two lists was very high, and the corresponding sorted list is presented in FIG. 8.

In one preferred embodiment of the invention, wherein the data being applied to a channel director from a host was uniformly written to the disk drive elements, it may only be necessary to monitor the data from one channel director over a period of time. However, in other embodiments of the invention wherein data is being applied to different disk drives, the system of the invention can be modified to collect not only the likelihood of occurrence of the read/write operations from one channel director (SCSI director) but also to determine the disk drive to or from which the block of data was sent, from which host it came from, and what other channel directors are performing. While this additional information can expand substantially, the tables of FIGS. 4A and 4B, and the list of FIG. 5, such added information may be necessary to adequately simulate the operation of the customer system at the test site.

Further, in other embodiments of the invention, it may be desirable, or necessary, to modify the location at which the read and write data is collected, to either the host computers (thus having a separate table for each host computer) or to the disk drives themselves (thus having a separate table for each disk drive) and in the latter instance, perhaps taking into account of the source (that is the SCSI adapter 34) from which the data was received. These varying degrees of granularity with which the data can be collected provide differing capabilities of analysis for the system, the analysis in each instance, however, being able to be completed at the remote site so long as the system being simulated is reproduced at the remote site.

Thus, referring again to FIG. 3, in general operation, the command, a Symmetrix command, or an equivalent command, is generated at 50 by either the host computer, a console PC attached to the disk controller system, or remotely through a telephone link (for example through the console PC). In response to receiving the resulting data (FIGS. 4A and 4B), at a selected level of granularity, the receiving system, (or if the new data of FIGS. 4A and 4B is sent to the remote test site, the remote site system) then creates the sorted or ordered list of operations, the sort parameter being the cumulative likelihood of occurrence of that entry and all more likely entries, if any (Step 60). The sorted list is then sent to to (Step 70), or is already at, the test site computer system, and is used there to simulate the read and write operations, in a statistical fashion, at the memory system. A random number generator, step 110, generates a number in the range of the cumulative likelihood of occurrence statistic. The entry having a larger value than the generated number and being closest to the generated number, is then implemented by the test system (Step 120). Thus the corresponding read or write operation is implemented with an I/O size identified by the entry. The read and write generation is repeated, preferably, for at least the "predetermined" period of time. If desired, the statistically identified read and write operations can be performed for an extended time period to allow proper system analysis to be completed.

A validity check can also be performed to ensure the correctness of the simulation process. In this instance, at the test site, another command, for example, a Symmetrix command, or the equivalent, is issued at 130 to collect the table information of FIGS. 4A and 4B for the test site, to create again a sorted list corresponding to FIG. 5 (Step 135). The sorted list from a test site is illustrated at FIG. 8. Thereafter the two sorted lists are compared to determine the validity of the test analysis. This is indicated at 140.

Figure 6:
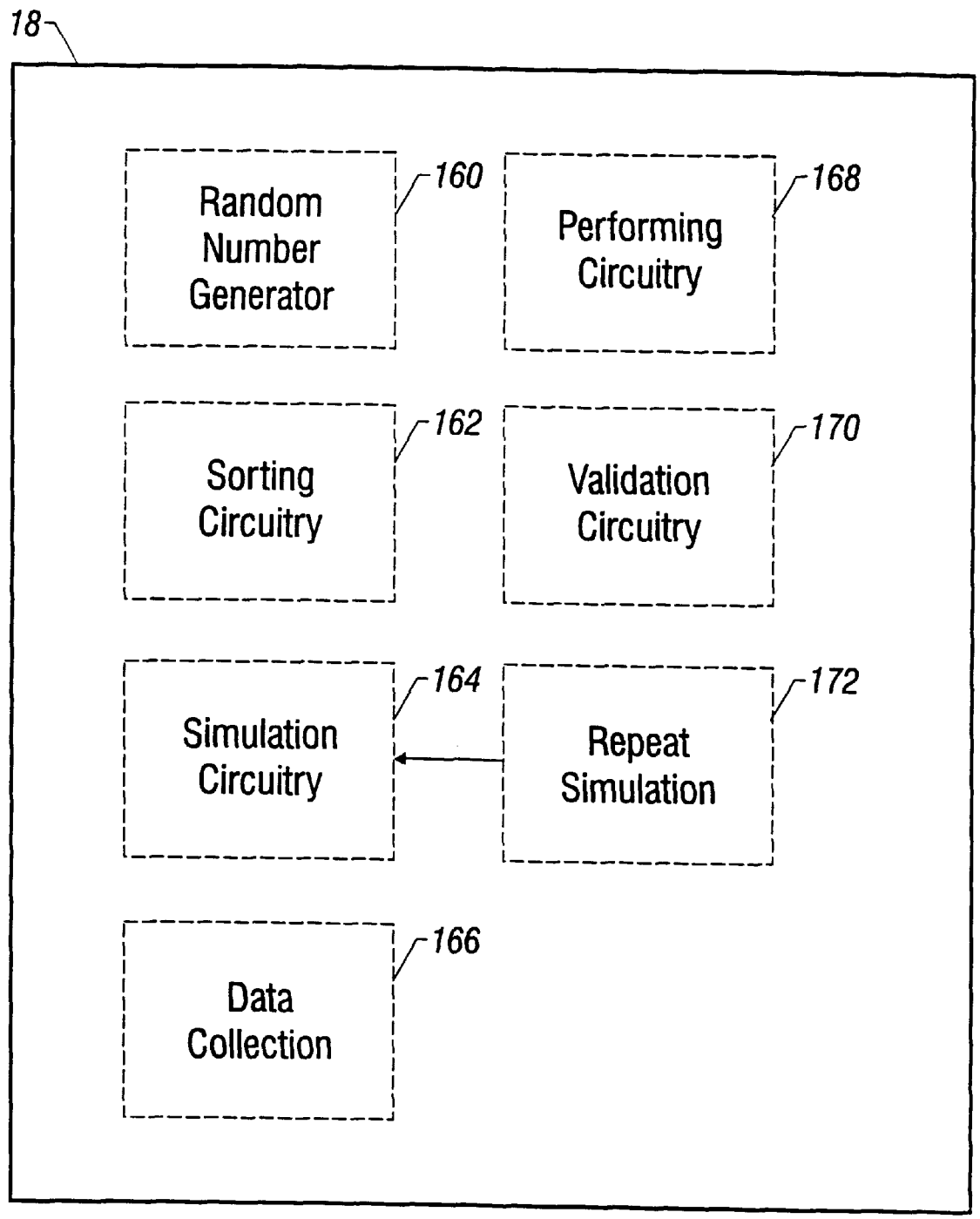
FIG. 6 is a diagram of implemented functions of the operation of the console PC.

Typically, the simulation process will be performed solely in software, in a suitably programmed digital computer such as console PC 18. In implementing the invention, the console PC implements, in software, the various functions of the invention and thus, in effect, includes (referring to FIG. 6) the following software implemented elements: a random number generator 160, a sorting circuitry 162, a simulation circuitry 164, a data collection circuitry 166, a performing circuitry 168, a validation circuitry 170, and elements 172 for repeating the simulation. These elements and circuitry can also be implemented in hardware, if desired.

As noted above, the level of granularity of the implementation will vary depending upon the particular systems being tested. A system wherein the data is uniformly distributed across the disk drives will have different characteristics and test requirements than a system wherein the data is stored in a less uniform manner across the disk drives, for example where different RAID levels are implemented. Such systems may require implementation of a separate software code either in the disk drive controller, or in equipment monitoring the read/write processes passing to and from the disk drive controller, either to the host computer(s) or to the disk drive unit(s) themselves.

These, and other additions, deletions, and modifications of the claimed invention will be apparent to those practiced in this field and are within the scope of the following claims.

What is claimed is:

1. A method for simulating the input/output operations to a first mass storage unit comprising the steps of determining, over a predetermined time period, a profile including the number of read and write operations for the storage unit and the number of blocks of data read or written during each operation, sorting the resulting data of the profile in accordance with the likelihood of occurrence of said operations, and performing, in a random statistical fashion, read and write operations in accordance with the sorted resulting data to simulate the frequency of occurrence of said read and write operations for said storage device.

2. The method of claim 1 wherein said performing step comprises the step of performing said read and write operations at a second mass storage unit thereby evaluating said storage unit operation without interrupting normal operation of said first storage unit.

3. The method of claim 2 further comprising the steps of repeating the determining and sorting steps as applied to the data written to and read from the second storage unit, and comparing the sorted resulting data from the operation of the first and second memories for validating the simulation operation.

4. The method of claim 1 wherein said sorting operation comprises the steps of ordering said resulting data in accordance with a decreasing likeihood of occurence, and associating, with each data entry, a cumulative likeihood of occurence value of that data entry and all more likely data entries.

5. The method of claim 4 wherein said performing step further comprises the steps of generating a random number in the range of said cumulative likelihood of occurrence values, and performing the operation of that entry having a closest associated cumulative likelihood of occurrence value greater than said generated random number, and repeating said generating and performing steps for at least said predetermined time period.

6. A system for simulating read and write operations for a mass storage device comprising a data collection element for accumulating, over a predetermined time period, a profile of the number of read and write operations for said storage device and including the number of blocks of data read or written during each operation, a sorting circuitry for sorting the resulting data of the profile in accordance with the likelihood of occurrence of the operations, and a simulation circuitry for performing, in a random statistical fashion, based on the sorted read and write operations, read and write operations for a storage system to simulate the frequency of occurrence of said read and write operations of said storage device.

7. The system of claim 6 wherein said storage device and said storage system have identical specifications.

8. The system of claim 6 wherein said storage device is a disk drive memory.

9. The system of claim 6 wherein said storage device has a plurality of disk drive memories and at least one disk drive controller.

10. The system of claim 6 wherein said storage system is a memory unit connected to a host computer.

11. The system of claim 6 wherein said simulation circuitry comprises circuitry for performing said read and write operations for said storage system as a location remote from said storage device, thereby evaluating said storage device operation without interrupting normal operation of said storage device.

12. The system of claim 11 further comprising data collection circuitry and sorting circuitry for repeating said accumulating and sorting operations regarding the read and write operations from and to the storage system, and validation circuitry for comparing the accumulated resulting data from operations for the storage device and operations for the storage system for validating the simulation process.

13. The system of claim 6 further wherein said sorting circuitry comprises circuitry for ordering the resulting data in accordance with a decreasing likelihood of occurence of a said read or write operation, and circuitry for associating, with each data entry, a cumulative likelihood of occurence value of that data entry and all more likely data entries.

14. The system of claim 13 wherein the simulation circuitry further comprises a random number generator for generating numbers uniformly distributed in the range of said cumulative likelihood of occurrence values, simulating circuitry for simulating the read or write operation having a closest associated cumulative likelihood of occurrence value greater than said random number, and circuitry for repeating operation of said random number generator and said simulating circuitry for at least a predetermined time period.

15. The system of claim 6 wherein said storage device is a disk drive array.

* * * * *